(12) United States Patent
Karasawa et al.

(10) Patent No.: US 6,621,723 B1
(45) Date of Patent: Sep. 16, 2003

(54) POWER CONVERTER

(75) Inventors: Dai Karasawa, Kanagawa-ken (JP); Katsumi Fukasawa, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 380 days.

(21) Appl. No.: 09/267,140

(22) Filed: Mar. 11, 1999

(30) Foreign Application Priority Data

Mar. 12, 1998  (JP) .......................................... 10-061191

(51) Int. Cl.[7] .......................... H02M 7/5387; H02M 5/45
(52) U.S. Cl. .......................................... 363/132; 363/37
(58) Field of Search .............................. 363/132, 131, 363/39, 41, 96, 98, 37

(56) References Cited

U.S. PATENT DOCUMENTS

| | | | | |
|---|---|---|---|---|
| 5,132,896 A | * | 7/1992 | Nishizawa et al. | 363/144 |
| 5,486,993 A | * | 1/1996 | Sakurai et al. | 363/98 |
| 5,576,944 A | * | 11/1996 | Uchino | 363/71 |
| 5,729,450 A | * | 3/1998 | Dimino et al. | 363/132 |

FOREIGN PATENT DOCUMENTS

| JP | 3-3473 | 1/1991 |
|---|---|---|
| JP | 10-66356 | 3/1998 |

* cited by examiner

Primary Examiner—Rajnikant B. Patel
(74) Attorney, Agent, or Firm—Oblon, Spivak, McClelland, Maier & Neustadt, P.C.

(57) ABSTRACT

A power converter including a plurality of arms. Each of the arms is composed of series connected first and second switching devices, first and second freewheeling diodes respectively connected in antiparallel with the first and second switching devices, and a phase capacitor connected in parallel with a series circuit of the first and second switching devices. The power converter further includes a DC power source connected between a DC positive bus and a DC negative bus, and a filter capacitor connected between the DC positive bus and the DC negative bus and in parallel with the DC power source. Each of the arms of the power converter is connected individually to the filter capacitor between the DC positive bus and the DC negative bus.

2 Claims, 5 Drawing Sheets

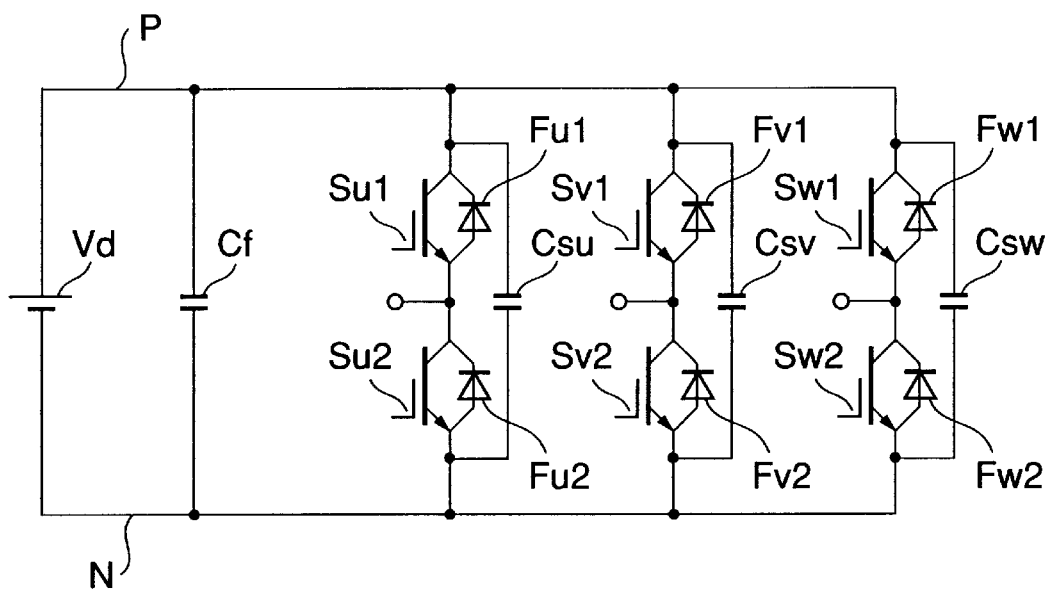
FIG. 3    (PRIOR ART)
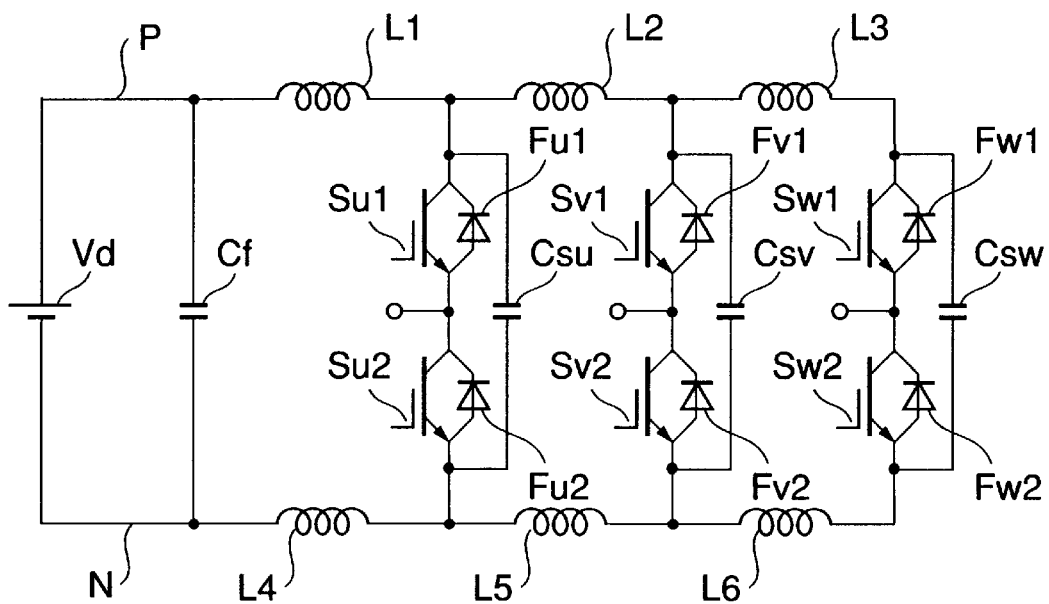
FIG. 4    (PRIOR ART)

POWER CONVERTER

BACKGROUND OF THE INVENTION

1. Field of the Invention

The present invention relates to a power converter, and more particularly to a power converter, such as a 2-level inverter etc., capable of performing the stabilized circuit operation by making the voltage in respective phases not affected by the voltage fluctuation resulting from the switching of the other phase switching devices.

2. Description of the Related Art

FIG. 3 is a circuit diagram showing the construction of an example of a conventional power converter (a 2-level inverter) that is generally used.

In FIG. 3, a DC power source Vd is connected between a DC positive bus P and a DC negative bus N. Further, a filter capacitor Cf is connected between DC positive bus P and DC negative bus N and in parallel with DC power source Vd.

On the other hand, between DC positive bus P and DC negative bus N, a U-phase first switching device Su1 and a U-phase second switching device Su2 are connected in series. Further, first and second freewheeling diodes Fu1 and Fu2 are respectively connected in antiparallel with first and second switching devices Su1 and Su2. In addition, a phase capacitor Csu of the U-phase is connected in parallel with a series circuit of first and second switching devices Su1 and Su2. A U-phase arm of the main body of the power converter (the inverter) is composed of these devices.

Further, between DC positive bus P and DC negative bus N, a V-phase first switching device Sv1 and a V-phase second switching device Sv2 are connected in series. Further, first and second freewheeling diodes Fv1 and Fv2 are respectively connected in antiparallel with first and second switching devices Sv1 and Sv2. In addition, a phase capacitor Csv of the V-phase is connected in parallel with a series circuit of first and second switching devices Sv1 and Sv2. A V-phase arm of the main body of the power converter (the inverter) is composed of these devices.

Further, between DC positive bus P and DC negative bus N, a W-phase first switching device Sw1 and a W-phase second switching device Sw2 are connected in series. Further, first and second freewheeling diodes Fw1 and Fw2 are respectively connected in antiparallel with first and second switching devices Sw1 and Sw2. In addition, a phase capacitor Csw of the W-phase is connected in parallel with a series circuit of first and second switching devices Sw1 and Sw2. A W-phase arm of the main body of the power converter (the inverter) is composed of these devices.

The output side of the main body of the power converter (inverter) is connected to a load such as a motor, etc. (not shown), which is controlled by the power converter at a variable speed.

Next, the assembly structure of the power converter shown in FIG. 3 is described below. FIG. 3A is a schematic plan view for explaining the assembly structure of the power converter shown in FIG. 3. In FIG. 3A, in the U-phase arm, a gate amplifier 11u (not shown in FIG. 3) is provided for generating gate signals to first and second switching devices Su1 and Su2. Furthermore, a cooler 12u (not shown in FIG. 3) is provided for cooling the heat generated by first and second switching devices Su1 and Su2.

Further in FIG. 3A, in the V-phase arm, a gate amplifier 11v (not shown in FIG. 3) is provided for generating gate signals to first and second switching devices Sv1 and Sv2. Furthermore, a cooler 12v (not shown in FIG. 3) is provided for cooling the heat generated by first and second switching devices Sv1 and Sv2.

Further in FIG. 3A, in the W-phase arm, a gate amplifier 11w (not shown in FIG. 3) is provided for generating gate signals to first and second switching devices Sw1 and Sw2. Furthermore, a cooler 12w (not shown in FIG. 3) is provided for cooling the heat generated by first and second switching devices Sw1 and Sw2.

As for the bus connection in the power converter, the U-phase arm is connected between DC positive bus P and DC negative bus N at a first position P3u adjacent to filter capacitor Cf. The V-phase arm is connected between DC positive bus P and DC negative bus N at a second position P3v a predetermined length lv distant from first position P3u. Further, the W-phase arm is connected between DC positive bus P and DC negative bus N at a third position P3w a predetermined length lw distant from second position P3v.

However, such a conventional power converter has a problem shown below. This point will be explained referring to a detailed diagram shown in FIG. 4. FIG. 4 is a detailed diagram for explaining the problem of the conventional power converter shown in FIG. 3.

That is, in the assembly structure of the power converter shown in FIG. 3A, there are wiring inductances L1, L4 between filter capacitor Cf and the U-phase arm, wiring inductances L2, L5 between the U-phase arm and the V-phase arm, and wiring inductances L3, L6 between the V-phase arm and the W-phase arm as shown in FIG. 4.

Therefore, at the time of switching of respective phases, the resonance is taken place between these wiring inductances L2, L3, L5, L6 and phase capacitors Csu, Csv, Csw, and thereby the power converter becomes in extremely complicated operations. As a result, currents and voltages of the power converter fluctuate remarkably, and it becomes impossible to operate the power converter stably.

As a result, conventional power converters are only applicable to power converters of very small capacity.

As described above, conventional power converters have a problem that the voltage in each phase changes because it is affected by the voltage fluctuation resulting from the switching of other phase switching devices, and thereby a stable circuit operation of the power converter cannot be obtained.

SUMMARY OF THE INVENTION

Accordingly, one object of the present invention is to provide a power converter capable of performing the stabilized circuit operation by making the voltage in respective phases not affected by the voltage fluctuation resulting from the switching of the other phase switching devices.

These and other objects of this invention can be achieved by providing a power converter including a plurality of arms. Each of the arms is composed of series connected first and second switching devices, first and second freewheeling diodes respectively connected in antiparallel with the first and second switching devices, and a phase capacitor connected in parallel with a series circuit of the first and second switching devices. The power converter further includes a DC power source connected between a DC positive bus and a DC negative bus, and a filter capacitor connected between the DC positive bus and the DC negative bus and in parallel with the DC power source. Each of the arms of the power converter is connected individually to the filter capacitor between the DC positive bus and the DC negative bus.

In the power converter as described above, as each phase arm of the main body of the power converter is individually connected to the filter capacitor between the DC positive bus and the DC negative bus, the resonance is not taken place between the phase capacitor and the wiring inductances in each phase. Accordingly, no resonant waveform is applied to the filter capacitor. This is because generally the capacitance of the filter capacitor is 10–100 times as large as that of the phase capacitor.

Thus, as the phase voltage for each phase is separated, the stabilized circuit operation can be carried without affected by the voltage fluctuation resulting from the switching of the other phase switching devices.

According to one aspect of this invention, there is provided a power converter including a plurality of arms. Each of the arms is composed of series connected first and second switching devices, first and second freewheeling diodes respectively connected in antiparallel with the first and second switching devices, a phase capacitor connected in parallel with a series circuit of the first and second switching devices, and a filter capacitor connected in parallel with a series circuit of the first and second switching devices. The power converter further includes a DC power source connected between a DC positive bus and a DC negative bus. Each of the arms of the power converter is connected individually to the DC power source between the DC positive bus and the DC negative bus.

In the power converter as described above, as the filter capacitor in the power converter, filter capacitors are provided for each phase. The filter capacitor of each phase is included in the arm of each phase, and the arm is made as one unit. This unit is connected individually to the DC power source between DC positive bus and the DC negative bus to suppress the voltage fluctuation resulting from the switching of the other phase switching devices.

Thus, the stabilized circuit operation can be carried out by making the voltage in respective phases not affected by the voltage fluctuation resulting from the switching of the other phase switching devices.

BRIEF DESCRIPTION OF THE DRAWINGS

A more complete appreciation of the invention and many of the attendant advantages thereof will be readily obtained as the same becomes better understood by reference to the following detailed description when considering in connection with the accompanying drawings:

FIG. 3 is a circuit diagram showing an example of a conventional power converter (2-level inverter) that is generally used;

FIG. 4 is a detailed diagram for explaining a problem of the conventional power converter shown in FIG. 3.

DETAILED DESCRIPTION OF THE PREFERRED EMBODIMENTS

Figure 1:
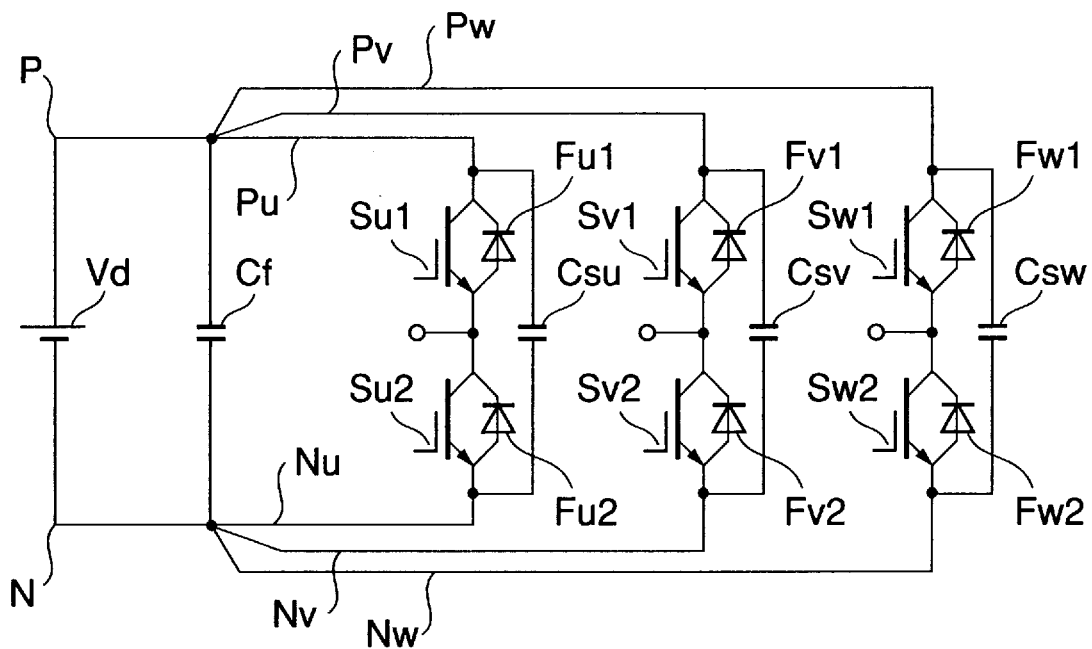
FIG. 1 is a circuit diagram showing a power converter according to a first embodiment of the present invention.

Referring now to the drawings, wherein like reference numerals designate identical or corresponding parts throughout the several views, the embodiments of this invention will be described below.

FIG. 1 is a circuit diagram showing a power converter according to a first embodiment of the present invention.

In FIG. 1, the U-phase arm of the power converter is composed of series connected switching devices Su1, Su2, freewheeling diodes Fu1, Fu2 respectively connected in antiparallel with switching devices Su1, Su2, and phase capacitor Csu of the U-phase connected in parallel with the series circuit of switching devices Su1, Su2.

The V-phase arm of the power converter is composed of series connected switching devices Sv1, Sv2, freewheeling diodes Fv1, Fv2 respectively connected in antiparallel with switching devices Sv1, Sv2, and phase capacitor Csv of the V-phase connected in parallel with the series circuit of switching devices Sv1, Sv2.

The W-phase arm of the power converter is composed of series connected switching devices Sw1, Sw2, freewheeling diodes Fw1, Fw2 respectively connected in antiparallel with switching devices Sw1, Sw2, and phase capacitor Csw of the W-phase connected in parallel with the series circuit of switching devices Sw1, Sw2.

Figure 1A:
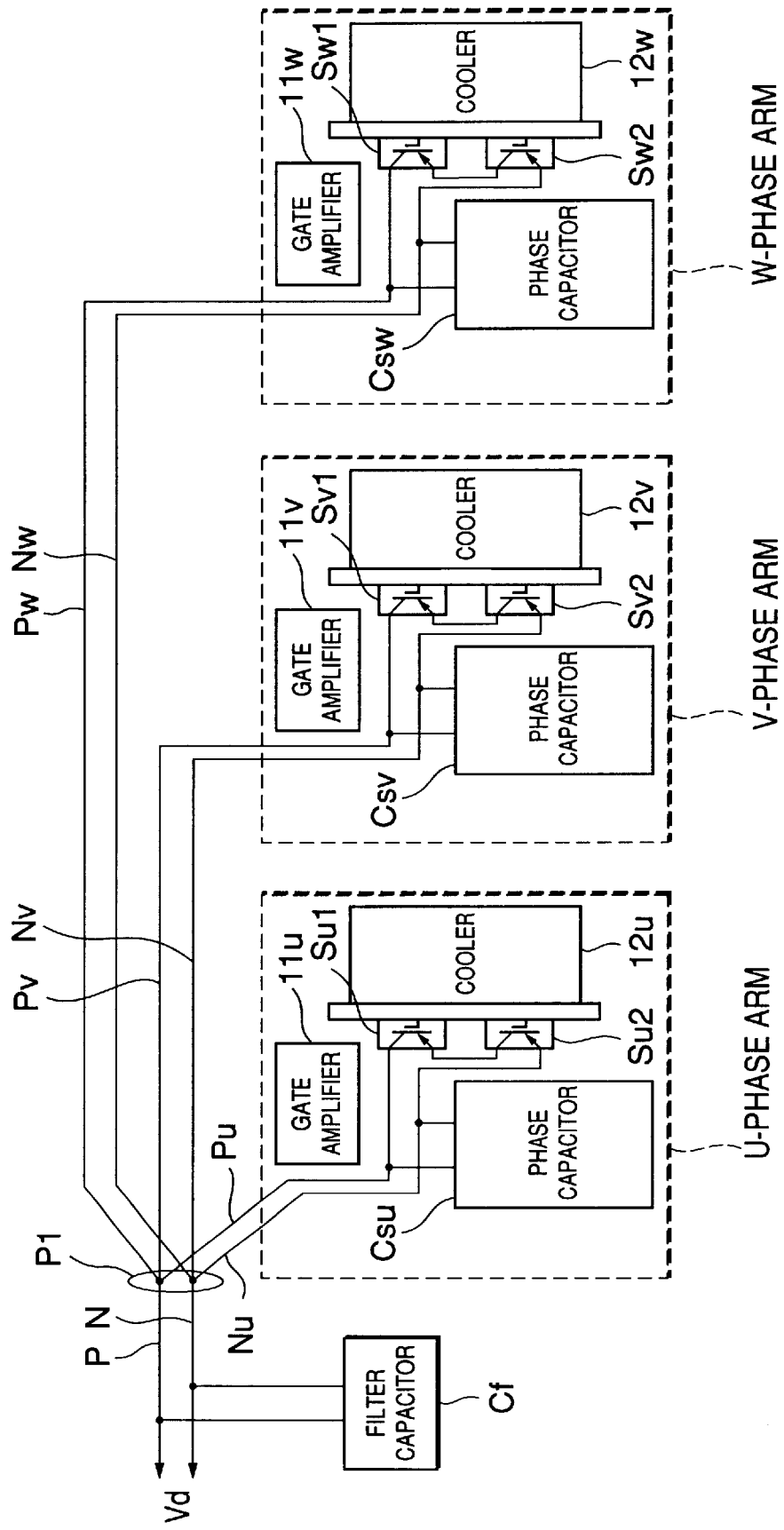
FIG. 1A is a schematic plan view for explaining the assembly structure of the power converter shown in FIG. 1.

Next, the assembly structure of the power converter shown in FIG. 1 is described below. FIG. 1A is a schematic plan view for explaining the assembly structure of the power converter shown in FIG. 1. In FIG. 1A, in the U-phase arm, gate amplifier 11$u$ (not shown in FIG. 1) is provided for generating gate signals to switching devices Su1 and Su2. Furthermore, cooler 12$u$ (not shown in FIG. 1) is provided for cooling the heat generated by switching devices Su1 and Su2.

In FIG. 1A, in the V-phase arm, gate amplifier 11$v$ (not shown in FIG. 1) is provided for generating gate signals to switching devices Sv1 and Sv2. Furthermore, cooler 12$v$ (not shown in FIG. 1) is provided for cooling the heat generated by switching devices Sv1 and Sv2.

In FIG. 1A, in the W-phase arm, gate amplifier 11$w$ (not shown in FIG. 1) is provided for generating gate signals to switching devices Sw1 and Sw2. Furthermore, cooler 12$w$ (not shown in FIG. 1) is provided for cooling the heat generated by switching devices Sw1 and Sw2.

As for the bus connection in the power converter, the U-phase arm is connected between DC positive bus P and DC negative bus N at a position P1 adjacent to filter capacitor Cf through a DC positive bus Pu and a DC negative bus Nu. The V-phase arm is connected between DC positive bus P and DC negative bus N at the same position P1 through a DC positive bus Pv and a DC negative bus Nv. Further, the W-phase arm is connected between DC positive bus P and DC negative bus N at the same position P1 through a DC positive bus Pw and a DC negative bus Nw.

As described above, the power converter is composed of DC power source Vd connected between DC positive bus P and DC negative bus N, filter capacitor Cf connected in parallel with DC power source Vd between DC positive bus P and DC negative bus N, and the U-, V- and W-phase arms connected individually to filter capacitor Cf at the same position P1 through DC positive buses Pu, Pv and Pw and DC negative buses Nu, Nv and Nw, respectively.

Accordingly, as each of the U-, V- and W-phase arms is connected individually at the same position P1 to filter capacitor Cf which is connected in parallel with DC power source Vd, the voltage change at the time of the switching of the switching devices in respective phases does not affect other phases. It is therefore possible to obtain the stabilized circuit operation of the power converter.

Figure 2:
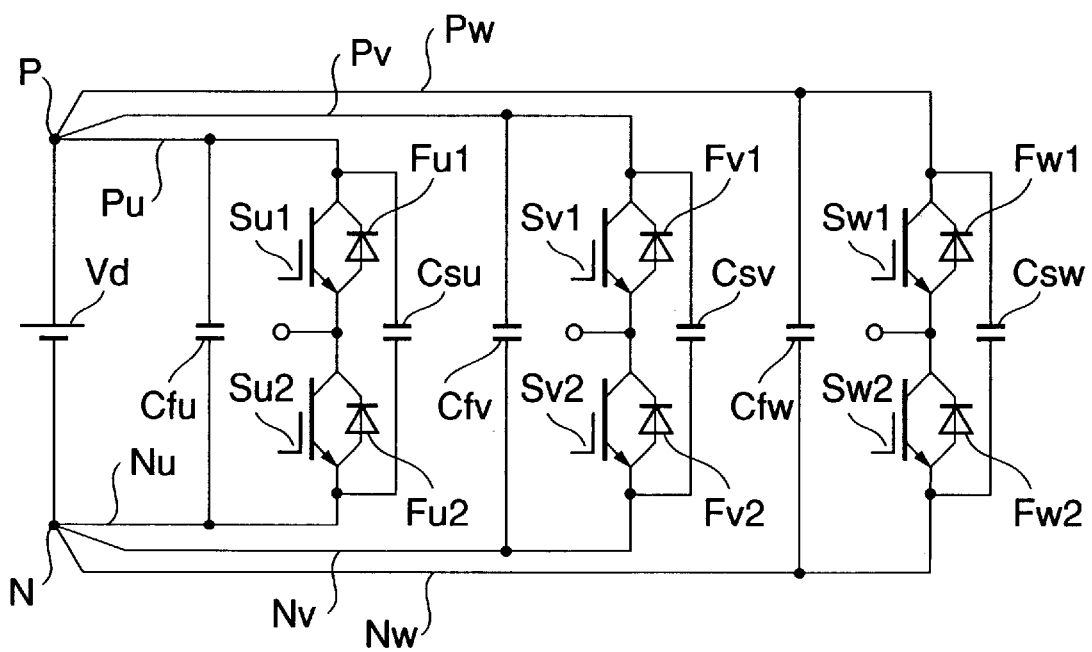
FIG. 2 is a circuit diagram showing a power converter according to a second embodiment of the present invention.

FIG. 2 is a circuit diagram showing a power converter according to a second embodiment of the present invention.

In FIG. 2, filter capacitor Cf in the power converter shown in FIG. 1 is substituted by filter capacitors Cfu, Cfv and Cfw of the each phase respectively provided in the U-, V- and W-phase arms.

In FIG. 2, a U-phase arm of the power converter is composed of series connected switching devices Su1, Su2, freewheeling diodes Fu1, Fu2 respectively connected in antiparallel with switching devices Su1, Su2, phase capacitor Csu of the U-phase connected in parallel with the series circuit of switching devices Su1, Su2, and U-phase filter capacitor Cfu connected in parallel with the series circuit of switching devices Su1, Su2.

In FIG. 2, a V-phase arm of the power converter is composed of series connected switching devices Sv1, Sv2, freewheeling diodes Fv1, Fv2 respectively connected in antiparallel with switching devices Sv1, Sv2, phase capacitor Csu of the V-phase connected in parallel with the series circuit of switching devices Sv1, Sv2, and V-phase filter capacitor Cfv connected in parallel with the series circuit of switching devices Sv1, Sv2.

In FIG. 2, a W-phase arm of the power converter is composed of series connected switching devices Sw1, Sw2, freewheeling diodes Fw1, Fw2 respectively connected in antiparallel with switching devices Sw1, Sw2, phase capacitor Csw of the W-phase connected in parallel with the series circuit of switching devices Sw1, Sw2, and W-phase filter capacitor Cfw connected in parallel with the series circuit of switching devices Sw1, Sw2.

Figure 2A:
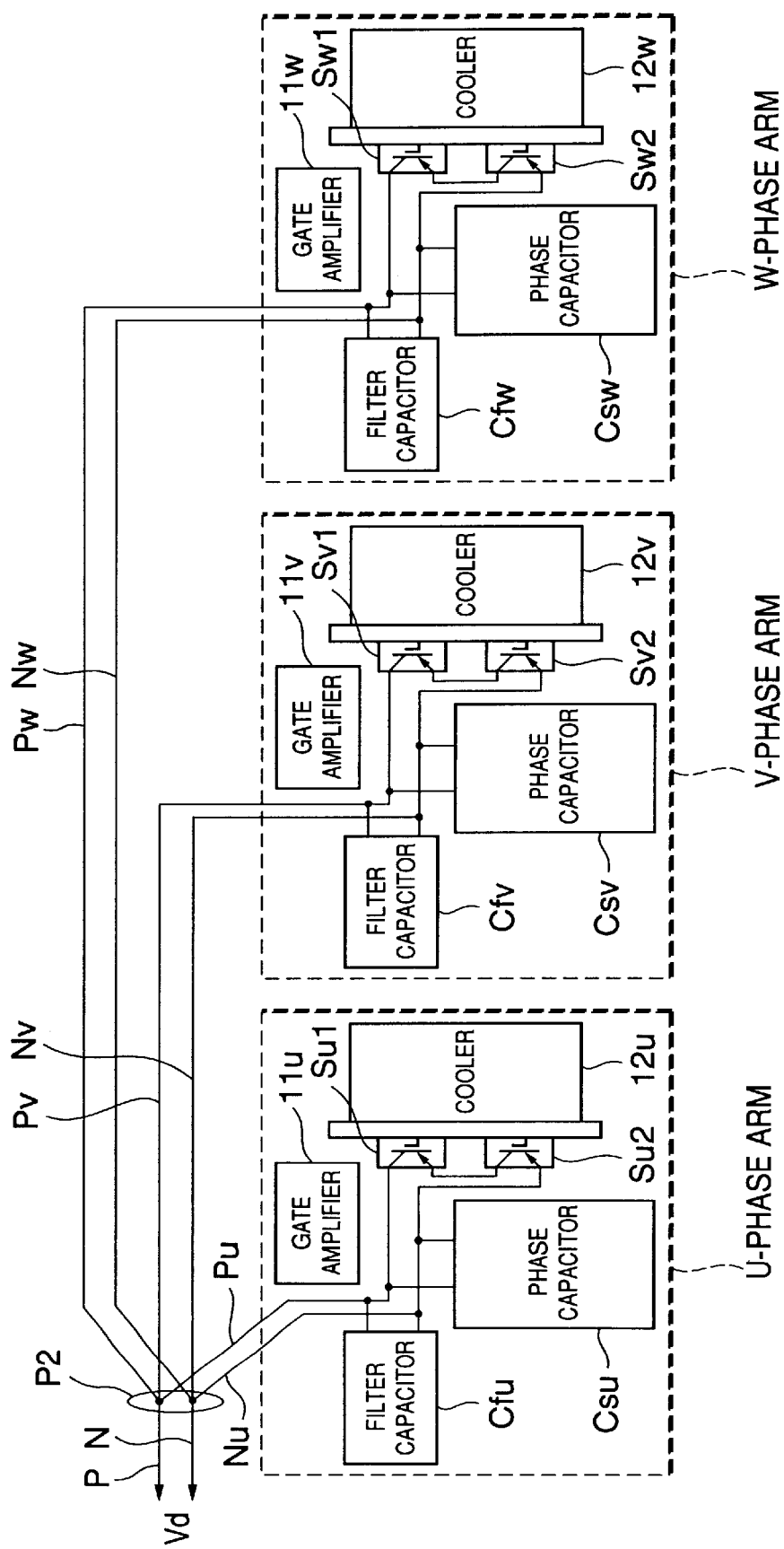
FIG. 2A is a schematic plan view for explaining the assembly structure of the power converter shown in FIG. 2.
Figure 3A:
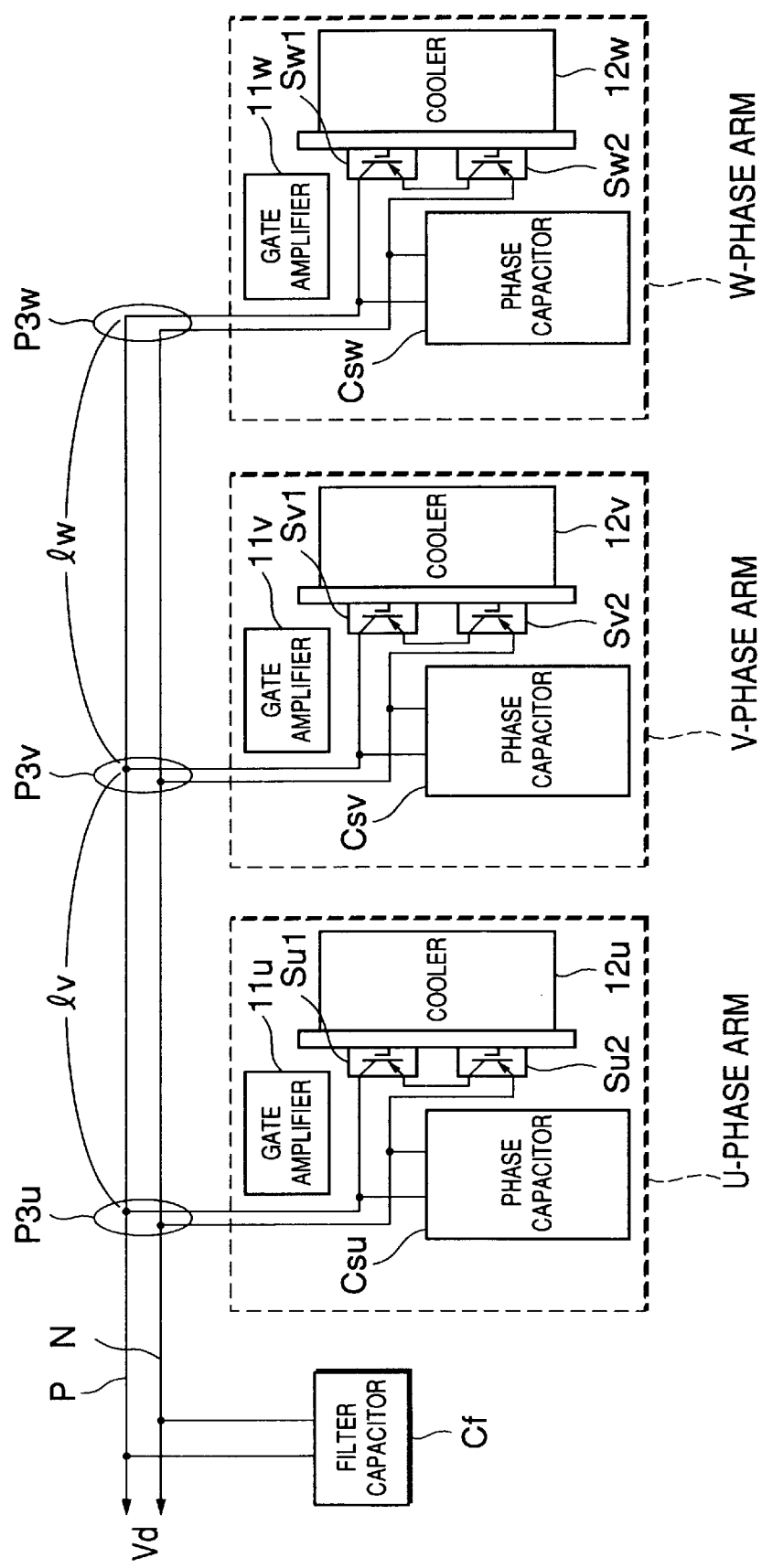
FIG. 3A is a schematic plan view for explaining the assembly structure of the power converter shown in FIG. 3.

Next, the assembly structure of the power converter shown in FIG. 2 is described below. FIG. 2A is a schematic plan view for explaining the assembly structure of the power converter shown in FIG. 2. In FIG. 2A, in the U-phase arm, gate amplifier 11$u$ (not shown in FIG. 2) is provided for generating gate signals to switching devices Su1 and Su2.

Furthermore, cooler 12$u$ (not shown in FIG. 2) is provided for cooling the heat generated by switching devices Su1 and Su2. Furthermore, U-phase filter capacitor Cfu is assembled in the U-phase arm.

In FIG. 2A, in the V-phase arm, gate amplifier 11$v$ (not shown in FIG. 2) is provided for generating gate signals to switching devices Sv1 and Sv2. Furthermore, cooler 12$v$ (not shown in FIG. 2) is provided for cooling the heat generated by switching devices Sv1 and Sv2. Furthermore, V-phase filter capacitor Cfv is assembled in the V-phase arm.

In FIG. 2A, in the W-phase arm, gate amplifier 11$w$ (not shown in FIG. 2) is provided for generating gate signals to switching devices Sw1 and Sw2. Furthermore, cooler 12$w$ (not shown in FIG. 2) is provided for cooling the heat generated by switching devices Sw1 and Sw2. Furthermore, W-phase filter capacitor Cfw is assembled in the W-phase arm.

As for the bus connection in the power converter, the U-phase arm is connected between DC positive bus P and DC negative bus N at a position P2 adjacent to DC power source Vd through DC positive bus Pu and DC negative bus Nu. The V-phase arm is connected between DC positive bus P and DC negative bus N at the same position P2 through DC positive bus Pv and DC negative bus Nv. Further, the W-phase arm is connected between DC positive bus P and DC negative bus N at the same position P2 through DC positive bus Pw and DC negative bus Nw.

As described above, the power converter is composed of DC power source Vd connected between DC positive bus P and DC negative bus N, and the U-, V- and W-phase arms connected individually to DC power source Vd at the same position P2 through DC positive buses Pu, Pv and Pw and DC negative buses Nu, Nv and Nw, respectively.

Accordingly, as each of the U-, V- and W-phase arms is connected individually at the same position P2 to DC power source Vd, the voltage change at the time of the switching of the switching devices in respective phases does not affect other phases. It is therefore possible to obtain the stabilized circuit operation of the power converter.

As described above, according to the present invention, it is possible to provide a power converter capable of performing the stabilized circuit operation by making the voltage in respective phases not affected by the voltage fluctuation resulting from the switching of the other phase switching devices.

Obviously, numerous modifications and variations of the present invention are possible in light of the above teachings. It is therefore to be understood that within the scope of the appended claims, the invention may be practiced otherwise than as specifically described herein.

What is claimed is:

1. A power converter, comprising:

a plurality of arms, each arm including series connected first and second switching devices, first and second freewheeling diodes respectively connected in antiparallel with said first and second switching devices, a phase capacitor connected in parallel with the series connected first and second switching devices, and an arm output providing a separate phase voltage for each arm;

a DC power source connected between a DC positive bus and a DC negative bus; and a filter capacitor connected between said DC positive bus at a DC positive bus connection and said DC negative bus at a DC negative bus connection, wherein each of said arms is individually connected to said DC positive bus connection and said DC negative bus connection so as to reduce fluctuations in each said separate phase voltage.

2. A power converter, comprising:

a plurality of arms, each arm including series connected first and second switching devices, first and second freewheeling diodes respectively connected in antiparallel with said first and second switching devices, a phase capacitor connected in parallel with the series connected first and second switching devices, a filter capacitor connected in parallel with the series connected first and second switching devices, and an arm output providing a separate phase voltage for each arm; and a DC power source connected between a DC positive bus at a DC positive bus connection and a DC negative bus at a DC negative bus connection, wherein each of said arms is individually connected to said DC positive bus connection and said DC negative bus connection so as to reduce fluctuations in each said separate phase voltage.

* * * * *